US010241832B2

(12) United States Patent
Naganathan et al.

(10) Patent No.: US 10,241,832 B2
(45) Date of Patent: Mar. 26, 2019

(54) RUNTIME DETERMINATION OF REAL TIME OPERATING SYSTEMS TASK TIMING BEHAVIOR

(71) Applicant: STEERING SOLUTIONS IP HOLDING CORPORATION, Saginaw, MI (US)

(72) Inventors: Vinod Shankar Naganathan, Saginaw, MI (US); Lonnie Newton, Saginaw, MI (US); Akilan Rathakrishnan, Cuddalore DT (IN)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 83 days.

(21) Appl. No.: 15/627,650

(22) Filed: Jun. 20, 2017

(65) Prior Publication Data
US 2017/0364389 A1  Dec. 21, 2017

Related U.S. Application Data

(60) Provisional application No. 62/352,280, filed on Jun. 20, 2016.

(51) Int. Cl.
*G06F 9/48* (2006.01)
*G06F 9/50* (2006.01)
*G06F 11/34* (2006.01)

(52) U.S. Cl.
CPC .......... *G06F 9/4887* (2013.01); *G06F 9/5038* (2013.01); *G06F 11/34* (2013.01)

(58) Field of Classification Search
CPC ...................................................... G06F 9/4887
(Continued)

(56) References Cited

U.S. PATENT DOCUMENTS 5,680,645 A * 10/1997 Russell ................. G06F 9/4843
710/48
6,779,173 B1 * 8/2004 Yomiya ..................... G06F 8/70
717/121

(Continued)

OTHER PUBLICATIONS

Puschner, Peter, and Ch Koza. "Calculating the maximum execution time of real-time programs." Real-time systems 1.2 (1989): pp. 159-176. (Year: 1989).*

(Continued)

*Primary Examiner* — Satish Rampuria
(74) *Attorney, Agent, or Firm* — Cantor Colburn LLP

(57) ABSTRACT

Technical solutions are described for determining and analyzing timing parameters to prognosticate a failure of one or more RTOS tasks. An example method includes dequeing a buffer queue entry from a buffer queue. In response to determining that a first task-id from the buffer queue entry does not match a second task-id from a topmost entry of a stack comprising buffer queue entries, the method includes pushing the buffer queue entry as a top-entry in a stack, updating a previous time sample value as the timestamp of the buffer queue entry, and accumulating a temporary execution time value for the second task-id from the stack. Further, in response to the first task-id matching the second task-id, computing an execution time value for the second task-id, updating the previous time sample value as the timestamp of the buffer queue entry, and popping the topmost entry from the stack.

18 Claims, 10 Drawing Sheets

(58) Field of Classification Search
USPC .................................................. 718/1–108
See application file for complete search history.

(56) References Cited

U.S. PATENT DOCUMENTS

| | | | |
|---|---|---|---|
| 7,509,639 B2* | 3/2009 | Worley, Jr. | G06F 9/468 |
| | | | 713/164 |
| 7,707,451 B2* | 4/2010 | Buskens | G06F 11/1417 |
| | | | 706/19 |
| 2011/0093853 A1* | 4/2011 | Bobak | G06Q 10/06 |
| | | | 718/100 |
| 2015/0058865 A1* | 2/2015 | Slinger | G06F 9/46 |
| | | | 718/106 |

OTHER PUBLICATIONS

Sangiovanni-Vincentelli, Alberto, and Marco Di Natale. "Embedded system design for automotive applications." Computer 40.10 (2007). pp. 42-51 (Year: 2007).*

Shin, Kang G., and Parameswaran Ramanathan. "Real-time computing: A new discipline of computer science and engineering." Proceedings of the IEEE 82.1 (1994): pp. 6-24. (Year: 1994).*

* cited by examiner

RUNTIME DETERMINATION OF REAL TIME OPERATING SYSTEMS TASK TIMING BEHAVIOR

CROSS-REFERENCES TO RELATED APPLICATIONS

This patent application claims priority to U.S. Provisional Patent Application Ser. No. 62/352,280, filed Jun. 20, 2016, which is incorporated herein by reference in its entirety.

BACKGROUND

The present application relates to computer technology, and more specifically, to real time operating systems (RTOS).

Typically, to determine the health of an operating system task, an RTOS provides task timing specific for the task. By analyzing the task timing, the health of the task may be determined, and responsive action(s) may be taken. However, the analysis is typically performed using an offline tool, for example to identify the worst case timing behavior of the task over a period of time. The contemporary techniques, however, fail to provide a real time measurement and analysis of the task during actual use of the task.

SUMMARY

According to one or more examples, the technical solutions described herein facilitate to determining timing parameters for tasks being executed on a real time operating system (RTOS). For example, a computer-implemented method is described for computing timing parameters of task-instances being executed by a real time operating system (RTOS) at runtime. The method includes dequeing a buffer queue entry from a buffer queue, the buffer queue entry comprising a first task-id of a first task instance executed by the RTOS, a timestamp associated with a start-time and/or an end-time of the task instance. The method further includes, in response to determining that the first task-id from the buffer queue entry does not match a second task-id from a topmost entry of a stack that contains buffer queue entries: pushing the buffer queue entry as a top-entry in a stack, updating a previous time sample value as the timestamp of the buffer queue entry, and accumulating a temporary execution time value for the second task-id from the stack. The method further includes, in response to determining that the first task-id from the buffer queue entry matches the second task-id from the topmost entry of the stack: computing an execution time value for the second task-id by adding the accumulated temporary execution time value for the second task-id and a difference between the timestamp from the buffer queue entry and the previous time sample value, updating the previous time sample value as the timestamp of the buffer queue entry, and popping the topmost entry from the stack.

According to one or more embodiments, a system for prognostication of real time operating system (RTOS) health, includes a memory, and a processor coupled with the memory. The processor operates the RTOS. The processor further analyzes a buffer queue that includes a plurality of buffer queue entries, a buffer queue entry containing a first task-id of a first task instance executed by the RTOS, a timestamp associated with a start-time and/or an end-time of the task instance. The processor further determines timing parameters of tasks executed by the RTOS by: dequeing the buffer queue entry from the buffer queue, comparing the buffer queue entry with a topmost entry of a stack, the stack comprising buffer queue entries. In response to determining that the first task-id from the buffer queue entry does not match a second task-id from a topmost entry of a stack comprising buffer queue entries, the processor: pushes the buffer queue entry as a top-entry in a stack, updates a previous time sample value as the timestamp of the buffer queue entry, and accumulates a temporary execution time value for the second task-id from the stack. The processor further, in response to determining that the first task-id from the buffer queue entry matches the second task-id from the topmost entry of the stack: computes an execution time value for the second task-id by adding the accumulated temporary execution time value for the second task-id and a difference between the timestamp from the buffer queue entry and the previous time sample value. The processor further updates the previous time sample value as the timestamp of the buffer queue entry, and pops the topmost entry from the stack. According to one or more embodiments, a steering system includes a controller that operates power assist functions of the steering system, the controller using a real time operating system (RTOS). The controller further performs prognostication of health of the RTOS by dequeing a buffer queue entry from a buffer queue, the buffer queue entry comprising a first task-id of a first task instance executed by the RTOS, a timestamp associated with a start-time and/or an end-time of the task instance. In response to determining that the first task-id from the buffer queue entry does not match a second task-id from a topmost entry of a stack comprising buffer queue entries, the controller: pushes the buffer queue entry as a top-entry in a stack, updates a previous time sample value as the timestamp of the buffer queue entry, accumulates a temporary execution time value for the second task-id from the stack, and computes an inter-arrival time for the first task-id. In response to determining that the first task-id from the buffer queue entry matches the second task-id from the topmost entry of the stack, the controller: computes an execution time value for the second task-id by adding the accumulated temporary execution time value for the second task-id and a difference between the timestamp from the buffer queue entry and the previous time sample value, computes a blocking time for the second task-id by subtracting, from the timestamp from the buffer queue entry, a second timestamp from the topmost entry from the stack and the execution time for the second task-id, updates the previous time sample value as the timestamp of the buffer queue entry, and pops the topmost entry from the stack.

These and other advantages and features will become more apparent from the following description taken in conjunction with the drawings.

BRIEF DESCRIPTION OF THE DRAWINGS

The subject matter which is regarded as the technical solutions is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
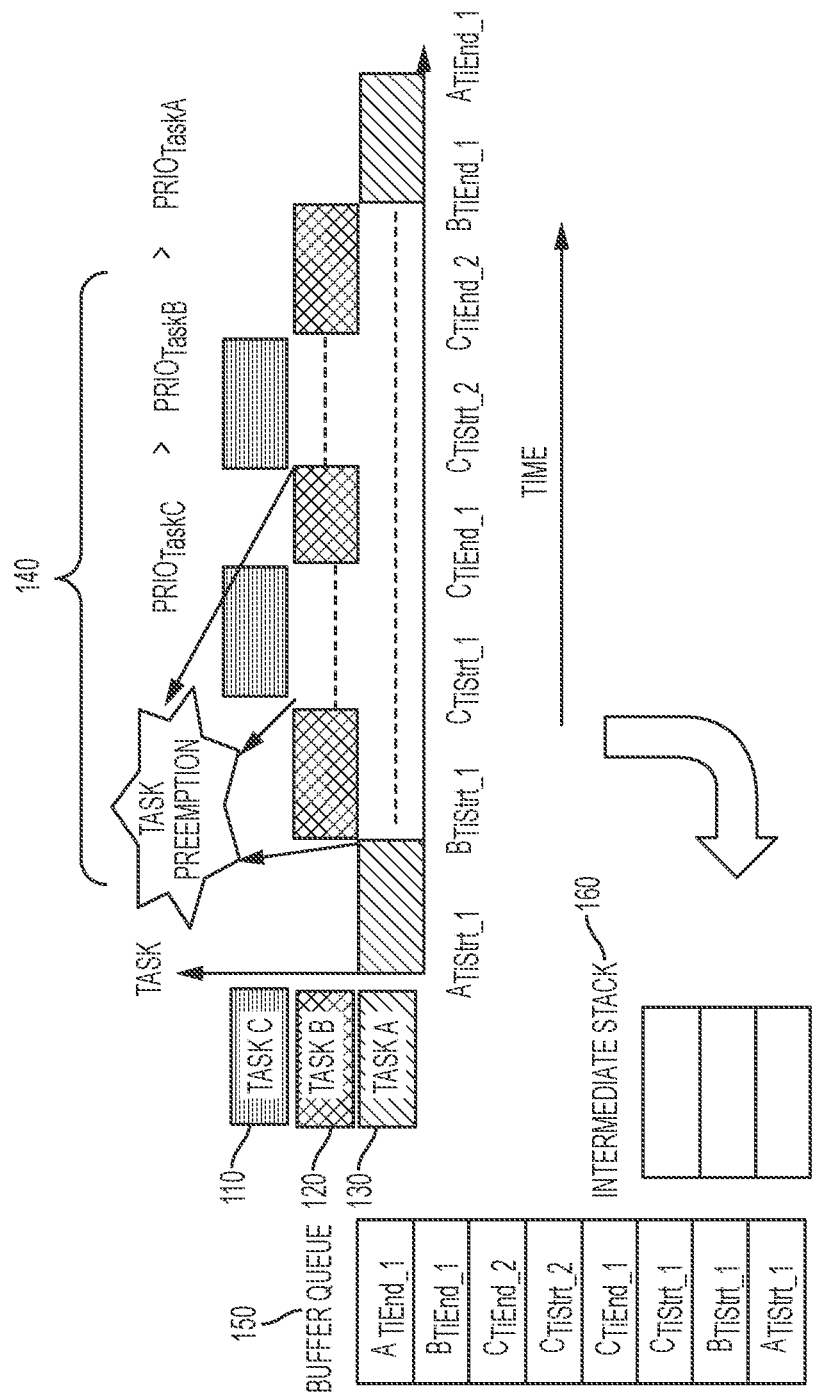
FIG. 1 illustrates an example scenario for an RTOS to determine the execution parameters of an RTOS according to one or more embodiments.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Referring now to the Figures, the technical solutions will be described with reference to specific examples, without limiting same, where the technical solutions facilitate determining timing parameters of a real time operating system (RTOS) for prognosticating or forecasting a failure in an RTOS task during runtime.

An RTOS is an operating system (OS) intended to serve real-time processing of data as the data is received. Examples of RTOS include VXWORKS™, WINDOWS CE™, FREERTOS™, RTEMS™, among others. A key characteristic of an RTOS is level of consistency in scheduling and completing a task. As used herein a task may be an operating system operation, which may be invoked by an application executing on the RTOS, or an Interrupt Service Routines (ISR), or the like. The execution time is the time for a single execution of the task.

Typically, the task has an associated deadline within which the task has to complete. A deadline miss is a scenario where the execution of the task does not complete before the task's deadline. In one or more examples, the deadline is an immediate next activation of the task. Alternatively, or in addition, the deadline includes a duration of a certain number of activations of the task. In one or more examples, the task may miss the deadline because of a failure of the task at runtime. In one or more examples, the task may miss the deadline because of a cascading effect caused by a failure of one or more other tasks. Hence, the deadline miss is an indication of the earliest point in time that a timing fault is detected. In a hard RTOS, such as one used in an electrical power steering system (EPS), task timing and task deadline play a critical role. The timing may get swayed away due to an erroneous behavior in any of the functionalities of the RTOS, and/or due to delays due to undetermined/unknown program flow.

To facilitate the prognostication of failure of an RTOS task, the technical solutions described herein determine parameters pertaining to each RTOS task. For example, the technical solutions described herein determine an execution time for a task, which is the time required by the task to complete all processing once. Alternatively or in addition, the technical solutions described herein determine inter-arrival time for the task, which is the time interval between two executions of the same task. Alternatively or in addition, the technical solutions described herein determine a blocking time for a task, which is the time interval for which higher priority tasks and/or ISR block the task.

FIG. 1 illustrates an example scenario for an RTOS to determine the execution parameters of an RTOS according to one or more embodiments. The example scenario includes three tasks that are being executed by the RTOS, task-A 110, task-B 120, and task-C 130. It should be noted that in other examples, the RTOS may execute a different number of tasks. Each task has a corresponding priority, where execution of a task with lower priority can be preempted by another task that has a higher priority. A priority of a task T is represented by $P_T$. In the example scenario, consider that $P_C > P_B > P_A$, that is task-C can preempt execution of task-B and/or task-A, and task-B can preempt execution of task-A.

FIG. 1 further depicts an example runtime scenario where instances of the tasks, task-A 110, task-B 120, and task-C 130, are executed in a particular chronological order 140. Execution of task-A 110 is preempted by an execution of task-B 120, which is further preempted by an execution of task-C 130. After completion of the task-C 130, task-B 120 resumes, however before completion of task-B 120, a second instance of task-C 130 preempts the execution of task-B 120. After completion of the second instance of task-C 130, the task-B 120 completes execution, followed by completion of the task-A 110 that was initially preempted. Such a sequence of execution is based on the priorities associated with the tasks. In other examples, with different priorities associated with the tasks, the order of execution can be different.

Figure 2:
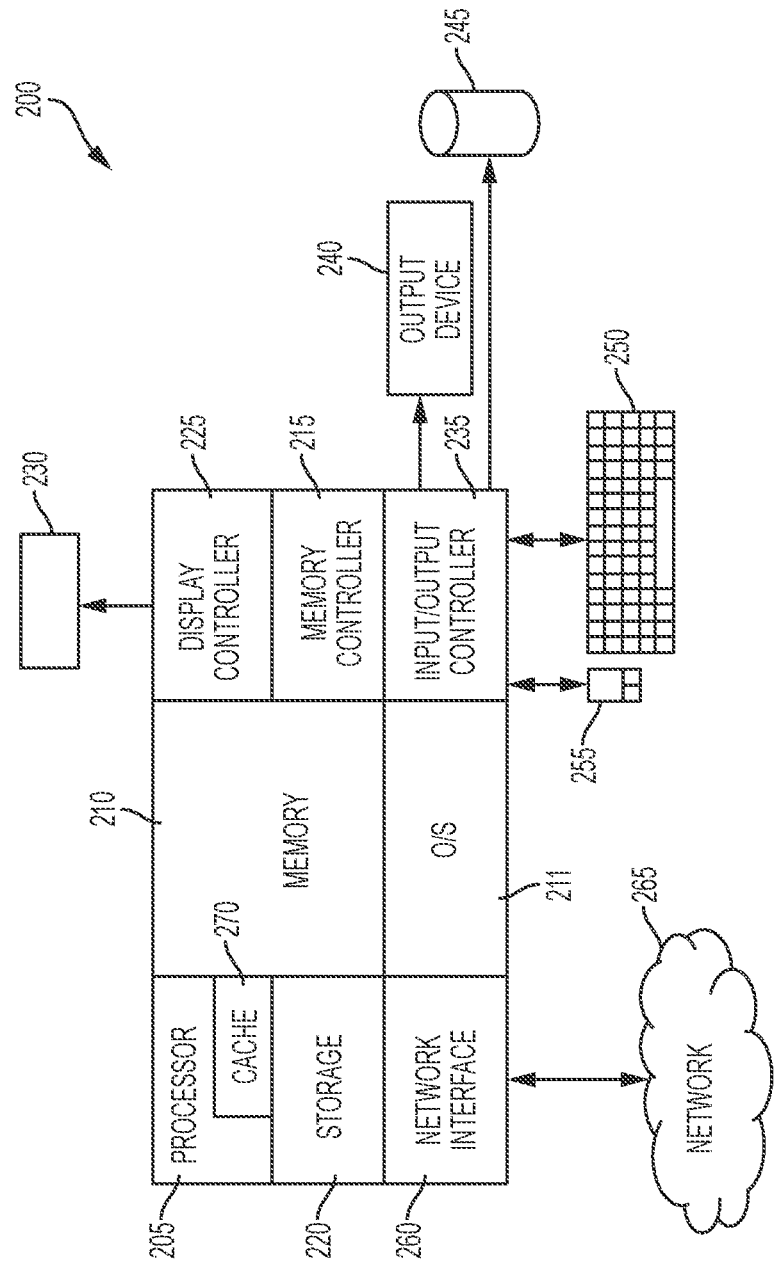
FIG. 2 illustrates example components of a system that executes an RTOS according to one or more embodiments.

FIG. 2 illustrates example components of a system 200 that executes the RTOS according to one or more embodiments. The system 200 may be a communication apparatus, such as a computer. In one or more examples, the system 200 may be an ECU of a vehicle, such as an ECU of the EPS of the vehicle. The system 200 may be part of a power steering system of vehicle, such as an automobile, boat, or the like. The system 200 may be part of any other product such as a television, a washing machine, a microwave oven, a vehicle infotainment system, or any other product. The system 200 may operate as an embedded processing system that executes the RTOS in the one or more products. The system 200 includes hardware, such as electronic circuitry.

For example, the system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art.

The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable RTOS 211. The RTOS 211 controls the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 165. The network 165 may be an IP-based network for communication between the system 200 and an external server, client and the like via a broadband connection. In an embodiment, the network 165 may be a satellite network. The network 165 transmits and receives data between the system 200 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet, a Controller Area Network (CAN) or other types of vehicle bus networks, or other suitable network system and may include equipment for receiving and transmitting signals.

In one or more examples, the system 200 prognosticates a deadline miss by monitoring and analyzing the execution time, inter-arrival time, and blocking time, for each task in the RTOS 211 at runtime. The execution time, inter-arrival time, and blocking time, are included as execution parameters of the task. In one or more examples, the RTOS 211 outputs the execution parameters of the task at runtime, for example via the display 230 and/or via the network 265. Alternatively, or in addition, the RTOS 211 stores the execution parameters in the memory 210 for offline access.

The RTOS 211 uses specific data structures, such as a queue, a stack, and other such data structures for determining the execution parameters of each task. For example, referring back to FIG. 1, the RTOS 211 uses a queue data structure, called a buffer queue 150, to store timing information about the execution and/or preemption of the tasks. The buffer queue 150 is a data structure that facilitates collection of the timing information in first in first out (FIFO) order. For example, the buffer queue 150 supports operations in which an addition of information is always to the rear terminal position (enqueue operation), and removal of timing information is always from the front terminal position (dequeue operation). In one or more examples, the RTOS 211 allocates the buffer queue 150 in the memory 210 (for example, RAM).

The buffer queue 150 enqueues and dequeues buffer queue entries. A buffer queue entry stores a timestamp and a task-id of a task from the RTOS 211. In one or more examples, two buffer queue entries are stored per instance of a task being executed, a first buffer queue entry including a timestamp indicating when a task (indicated by the task-id) goes into a running state, and a second buffer queue entry including a timestamp and task-id indicating when the task completes execution. The timestamp is based on a global time from a clock, such as a hardware clock that is part of the processor 205. Alternatively, or in addition, the clock is executed by the processor 205.

In one or more examples, an initiation of a task for execution represents the task going into a running state, and end of the task's execution indicates completion of the task. In one or more examples, each task includes specific computer executable instruction that indicates the start and end of the execution of the task.

The contents of the buffer queue 150 are monitored and analyzed periodically at fixed time intervals, for example, 2 milliseconds, 5 milliseconds, and so on, which may be referred to as an analysis bracket. The size of the buffer queue 150 may be predetermined so as to store the buffer queue entries corresponding to a predetermined number of tasks that the RTOS 211 is configured to execute. For example, the RTOS 211 is programmed with a predetermined set of tasks. In one or more examples, the buffer queue 150 is sized to store timestamps for a predetermined number of tasks that the RTOS may process in an analysis bracket interval.

Referring back to FIG. 1, the RTOS 211 further uses a stack data structure, called an intermediate stack 160, to analyze the buffer queue entries. The intermediate stack 160 is a data structure that facilitates collection of the timing information in a last in first out (LIFO) order. For example, the intermediate stack 160 supports operations in which an addition of information is at the front terminal position (push operation), and removal of timing information is always from the front terminal position (pop operation). The intermediate stack 160 is allocated in the memory 210 (RAM).

The intermediate stack 160 pushes and pops buffer queue entries from the buffer queue 150 during the analysis bracket. The size of the intermediate stack 160 may be based on the predetermined number of tasks in the RTOS 211. In one or more examples, the buffer queue 150 is allocated to have a predetermined size of two times the number of task activations within an analysis bracket.

Further, in one or more examples, the RTOS 211 uses an inter-arrival time buffer, and an inter-arrival previous start-time buffer, which may be allocated in the memory 210 (RAM). The size of the inter-arrival time buffer may be based on a number of tasks used to compute the inter-arrival time.

Figure 3A:
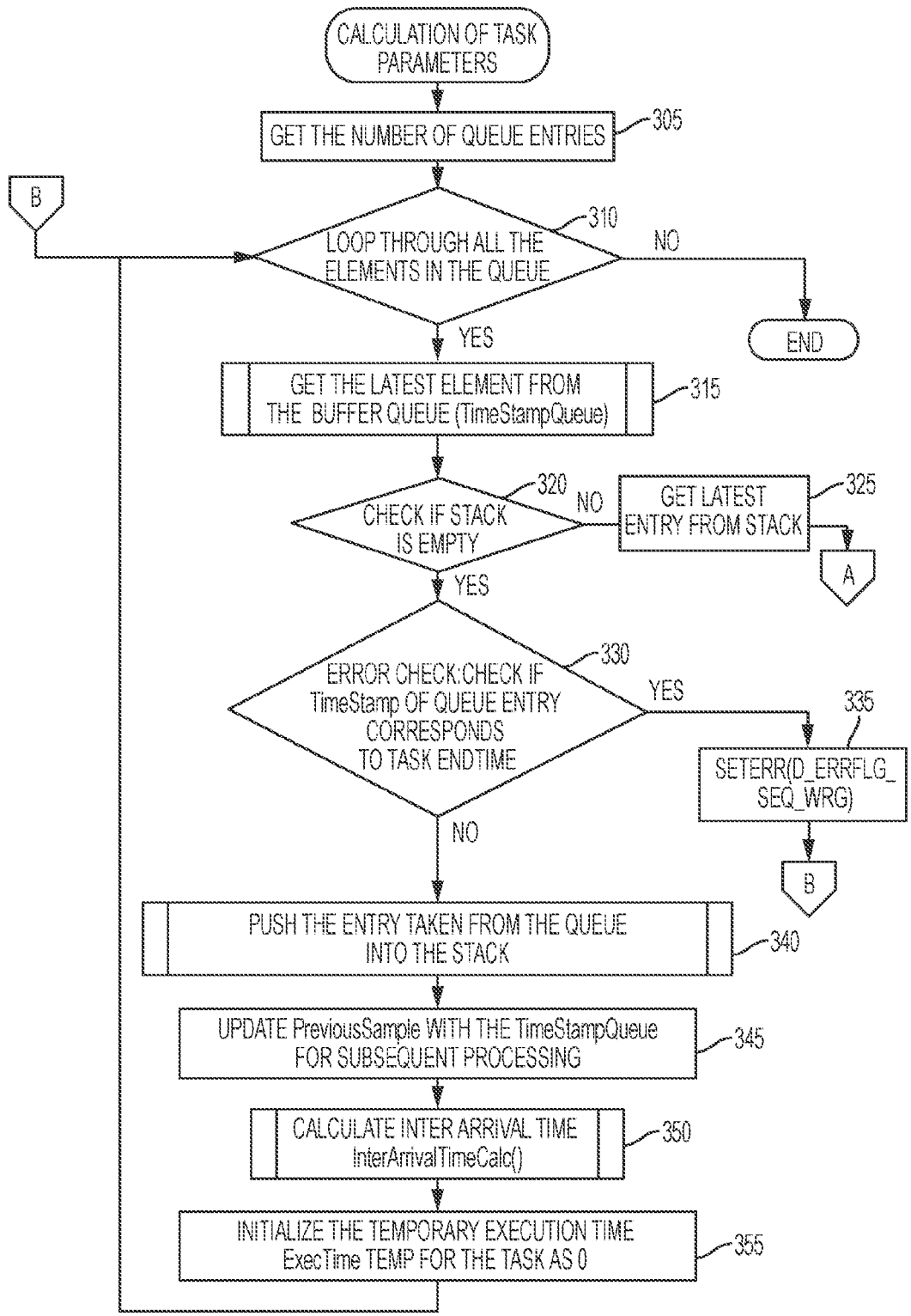
FIG. 3A illustrates a flow chart of an example method for determining execution parameters of tasks executed by an RTOS at runtime according to one or more embodiments.
Figure 3B:
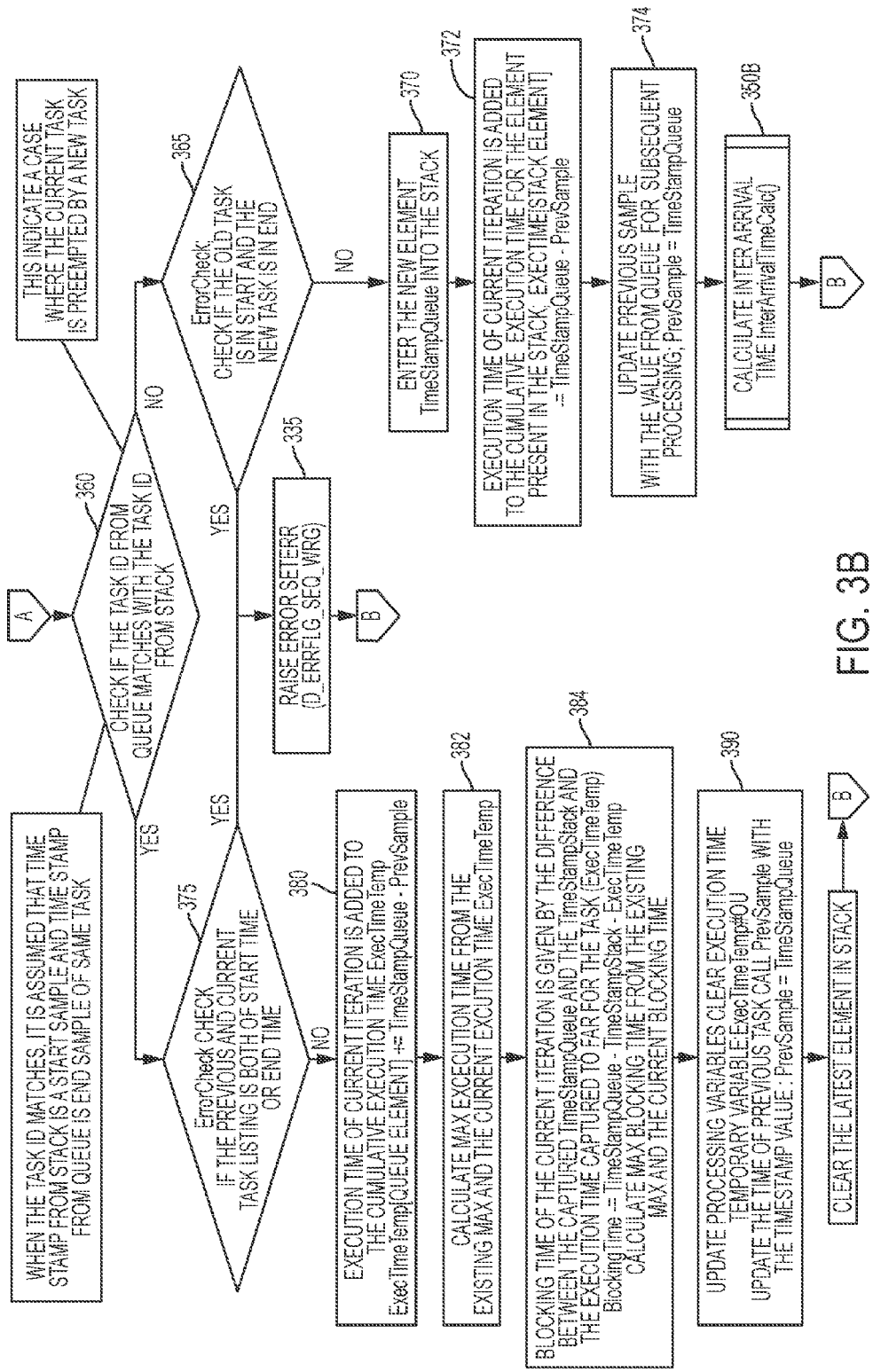
FIG. 3B illustrates a flow chart of an example method for determining execution parameters of tasks executed by an RTOS at runtime according to one or more embodiments.

FIGS. 3A-3B depict a flowchart for determining the execution parameters of each task of the RTOS 211 at runtime, according to one or more embodiments. In one or more examples, the technical solutions herein facilitate determining the execution parameters at runtime by invoking checkpoint function calls at the start and end of each task. In one or more examples, the checkpoint function is a lightweight function that updates the buffer queue 150 with the current global time and the task-id of the task that is being initiated or ended. The method depicted by the flowchart is executed by the RTOS 211 periodically at each analysis bracket to determine the execution parameters. The periodic task is initiated as an RTOS background process, in one or more examples.

FIGS. 5-8 depict intermediate states of the buffer queue 150 and the intermediate stack 160, along with one or more additional values that the RTOS 211 maintains for execution of the method. The intermediate states depicted are based on the example scenario with the three tasks, task-A 110, task-B 120, and the task-C, with corresponding priorities and execution as shown in FIG. 1. In the illustrated example, consider that the intermediate stack 160 is empty at the beginning. The buffer queue 150 is updated at every start and end of the tasks with the timestamp and the task-id detail. It is understood that in other examples, the initial state may be different from the example illustrated.

It should be noted that in other examples, the intermediate states of the buffer queue 150 and the intermediate stack 160 can be different based on the execution and priorities of the tasks. Further, in the example described herein, it is assumed that only one instance of a task is active at any given instant. However, it should be noted that the technical solutions described herein are effective in other examples where multiple instances of the same task are active in the RTOS 211 at a given instant.

Referring now to FIG. 3A, the RTOS 211 gets a number of buffer queue entries, as shown at 305. The RTOS 211 loops through all of the buffer entry queues with the method ending once all buffer queue entries have been analyzed, as shown at 310. As long as there are buffer queue entries that have not yet been analyzed, the RTOS 211 dequeues a buffer entry queue, the buffer queue 150 being a FIFO data structure, as shown at 315. The RTOS 211 further checks if the intermediate stack 160 is empty, as shown at 320.

If the intermediate stack 160 is empty, the RTOS 211 performs an error check, as shown at 330. The RTOS 211 checks the latest buffer queue entry accessed to determine if the timestamp in the entry is indicative of an end-time of a task, as shown at 330. If the timestamp is indicative of a task end time, the RTOS 211 deems that an error has occurred and sets a corresponding error flag, as shown at 335. The RTOS 211, in one or more examples, raises an error to an operator, such as via the display 230 and/or the network 265. In one or more examples, if the system 200 is an ECU of a vehicle, such as a controller of a steering system, the error flag may cause the ECU to limit the functionality of the vehicle.

If the timestamp in the latest buffer queue entry is not indicative of a task end-time, the RTOS 211 pushes the buffer queue entry in the intermediate stack 160, as shown at 340. The RTOS 211 further updates a previous time sample (PreviousTs) value that the RTOS 211 maintains to the value of the timestamp from the buffer queue entry, as shown at 345. The previous time sample value is initialized to 0 (zero) at the outset of the method. The RTOS 211 updates an inter-arrival time for the task in the buffer queue entry, as shown at 350. Further, the RTOS 211 initializes a temporary execution time for the task in the buffer queue entry to 0, as shown at 355.

Figure 5:
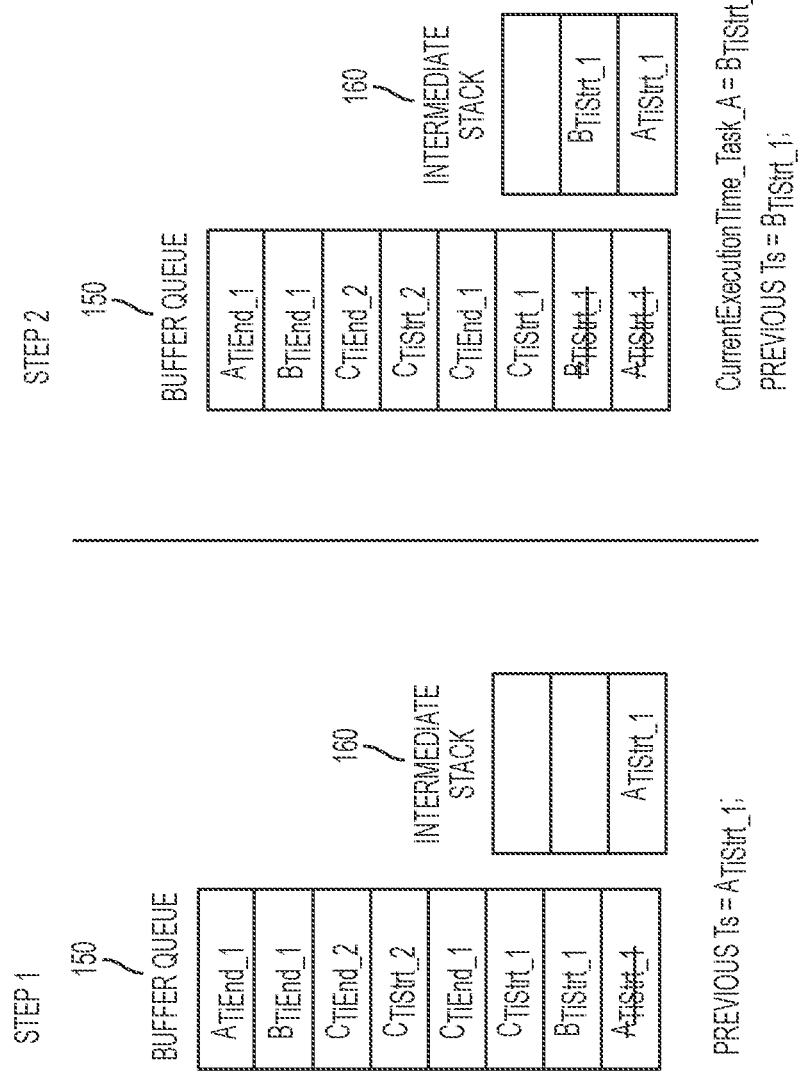
FIG. 5 depicts intermediate states during an example implementation of a method for determining execution parameters of tasks executed by an RTOS at runtime.

In FIG. 5, step-1 indicates an intermediate state after the above operation, where a buffer queue entry for task-A start-time is dequeued from the buffer queue 150 and pushed into the intermediate stack 160. Previous Ts is updated to the start-time of the task-A 110.

Figure 4:
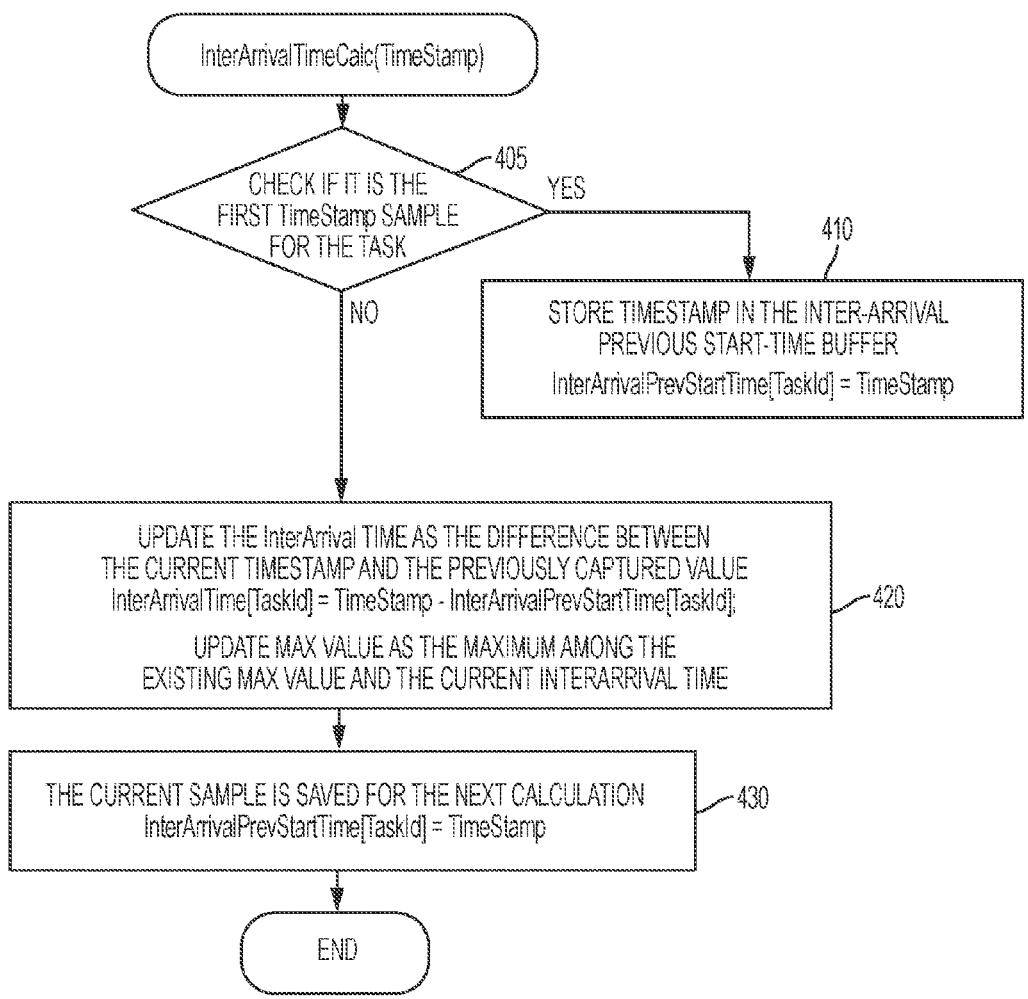
FIG. 4 illustrates a flow chart of an example method for determining inter-arrival time for tasks executed by an RTOS at runtime according to one or more embodiments.

FIG. 4 depicts a flowchart for calculating the inter-arrival time for a task according to one or more embodiments. Referring to FIG. 3A, the inter-arrival time for a task is computed at block 350 when a buffer queue entry is being pushed into the intermediate stack 160. For computing the inter-arrival time for each task instance, the RTOS 211 maintains two buffers in the memory 210, an inter-arrival time buffer and an inter-arrival previous start-time buffer. In one or more examples, both buffers use the array data structure. In one or more examples, both the buffers are allocated to a predetermined size of max number of activations per task times the number of predetermined tasks in the RTOS 211. It should be noted that in other examples, the buffers may be allocated dynamically or of different size than above example. In one or more examples, the entries in the buffers are accessed using the task-id of the instance of the task.

Referring now to FIG. 4, the RTOS 211 checks if the timestamp for the instance of task from the buffer queue entry is a first timestamp being recorded for that instance of the task, as shown at 405. For example, the RTOS 211 checks if the entry in the inter-arrival buffer corresponding to the task-id of the instance of the task is set to a default value, such as 0 (zero). If the value in the inter-arrival buffer is the default value, this is the first timestamp being recorded for the task instance, else not.

In case the timestamp is the first timestamp for the task instance, the timestamp from the buffer queue entry is stored in the inter-arrival previous start-time buffer in an entry corresponding to the task-id, as shown at 410. In case the timestamp is not the first timestamp for the task instance, the RTOS 211 updates the inter arrival time for the task instance, as shown at 420. For example, the inter-arrival time for the task-id is computed and updated by subtracting the value from the inter-arrival previous start-time buffer for the task-id from the timestamp. In one or more examples, the RTOS 211 maintains a maximum inter-arrival time seen so far by updating a max-inter-arrival-time value with the computer inter-arrival time if the computed inter-arrival time exceeds the existing max-inter-arrival-time value. Further, the timestamp from the buffer queue entry is stored in the inter-arrival previous start-time buffer in an entry corresponding to the task-id, as shown at 430.

Thus, in one or more examples, when a new entry of a task is added, the inter-arrival time is determined by finding a difference between the timestamp of the task and the timestamp of the same task in the inter-arrival time buffer. After this calculation, the timestamp of the current entry of the task is updated in the inter-arrival time buffer. This step is repeated each time a new entry for the task is added into the buffer queue and/or the intermediate stack.

Referring back to FIG. 3A, at block 320, if the intermediate stack 160 is not empty, the RTOS 211 checks if the topmost entry from the intermediate stack 160, as shown at 325. Note that the topmost entry from the intermediate stack 160 is not popped at this time. The flowchart continues into FIG. 3B. The RTOS 211 compares the task-id of the buffer queue entry that was dequeued (315) and the task-id of the topmost stack entry, as shown at 360. If the task-ids match, the RTOS 211 has found the task end-time in the buffer queue 150 corresponding to the start-time of in the stack 160. If the task-ids do not match, it represents a case where the task with the start-time in the intermediate stack 160 has been preempted by the task from the dequeued buffer queue entry.

Consider the case where the task-id from the buffer queue entry does not match the task-id from the topmost stack entry. Such a case is depicted in FIG. 5, STEP-2. The dequeued buffer queue entry is a start-time for the task-B 120 (BTiStrt_1) and the topmost entry in the intermediate stack 160 is a start-time for the task-A 110, (ATiStrt_1). Now referring back to FIG. 3B, the RTOS 211 checks status of the tasks identified by the task-ids in both entries, the buffer queue entry and the topmost stack entry, as shown at 360. If the task in the intermediate stack is still being executed, and if the task from the buffer queue entry has ended, the RTOS 211 sets a corresponding error flag and enters an error state, as shown at 335. In any other case, the RTOS 211 pushes the buffer queue entry into the intermediate stack 160, as shown at 370. In FIG. 5, STEP-2, the BTiStrt_1 is added into the intermediate stack 160.

Further, the RTOS 211 updates the execution time of the task with the entry in the intermediate stack 160, that is task-A 110 in the example of FIG. 5, as shown at 372. The execution time of the task from the topmost entry in the stack is updated by adding to existing value of the execution time of the task-id. For example, in this case execution time of task-A is incremented by a value equal to a difference between the timestamp of the buffer queue entry and the previous time sample (PreviousTs) value. For example, ExecTimeTemp[StackEntry]=ExecTimeTemp[StackEntry]+(Timestamp[QueueEntry]−PreviousTs). In this case, ExecTimeTemp[A]=ExecTimeTemp[A]+(Timestamp_Start(B)−PreviousTs).

The RTOS 211 maintains temporary execution time values for each of the task instances that are active.

Figure 6:
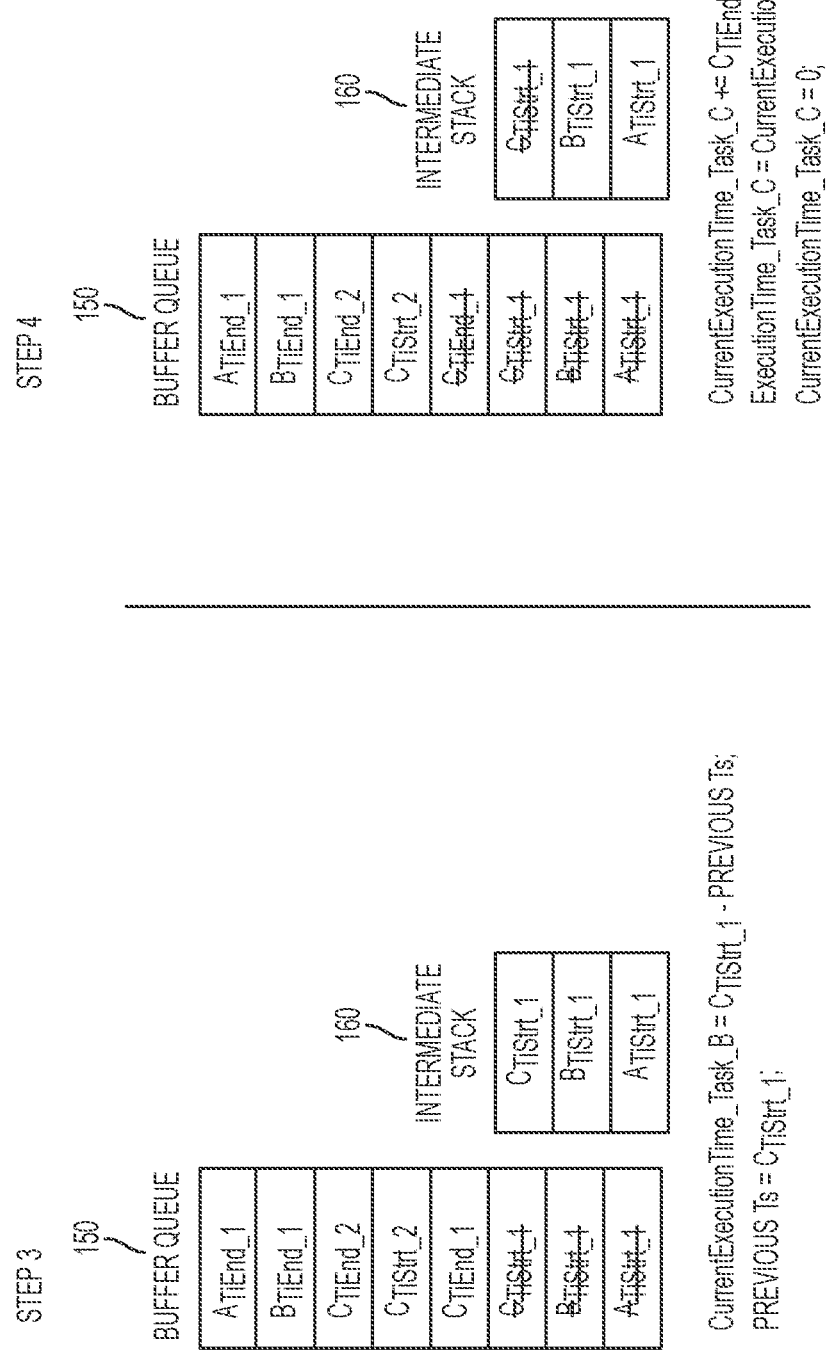
FIG. 6 depicts intermediate states during an example implementation of a method for determining execution parameters of tasks executed by an RTOS at runtime.

Further yet, the previous time sample PreviousTs is updated to the timestamp from the buffer queue entry, as shown at 374. In this case, PreviousTs is set to the BTiStrt_1 timestamp, as shown in FIG. 5, STEP 2. Further, the inter-arrival time for task-A 110 is updated, as shown at 350B. in one or more examples, the RTOS 211 updates the inter-arrival time as depicted in FIG. 4. The RTOS 211 continues to analyze the buffer queue 150 until all the buffer queue entries are processed. Thus, in the ongoing example scenario, a buffer queue entry corresponding to the start-time of a first instance of the task-C 130 (CTiSrt_1) is dequeued and pushed into the intermediate stack 160, as shown at FIG. 6, STEP-3.

Further, when the RTOS 211 encounters the buffer queue entry corresponding to the end-time of the first instance of the task-C 130, (CTiEnd_1), the RTOS 211 is in the case where the task-id from the buffer queue entry matches the task-id from the topmost stack entry, as shown at 360. The RTOS 211 checks if the timestamps from both the buffer queue entry and the topmost stack entry are indicative of start-times or end-times, as shown at 375. If both entries are indicative of the same type of time, the RTOS sets a corresponding error flag and enters the error state as shown at 335.

If the two timestamps, one from the buffer queue entry and another from the topmost stack entry are indicative of different types of times for the same task, the RTOS 211 computes the execution parameters for the instance of the task that has ended. Accordingly, the RTOS 211 computes an execution time of the task by updating the temporary execution time that the RTOS 211 maintains for each task activation, as shown at 380. In the ongoing example, consider the FIG. 6, STEP-4, where execution of the first instance of the task-C 130 has ended. Here, the execution time for the task-C 130 is updated as ExecTimeTemp(C1)=ExecTimeTemp(C1)+(Timestamp_End(C1)−PreviousTs). Further, the temporary execution time for the task is copied as the final execution time, because the task has now completed execution. Thus, ExecTime(C1)=ExecTimeTemp(C1).

In other words, once a pair of corresponding start-time and end-time is found, then the execution time is determined as the time difference between the second entry of the pair and the PreviousTs, which is the timestamp of the latest entry that is moved into the intermediate stack (as indicated in the Step 4) during the previous step. Further, the blocking time is determined as Blocking Time=(TiEnd time−TiStrt time)−Execution Time for the task.

In one or more examples, the RTOS 211 maintains a maximum execution time value, as shown at 382. For example, the RTOS 211 compares the computed execution time with a current value of the maximum execution time, and updates the maximum execution time with the computed value if the latter exceeds the former.

Further, the RTOS 211 updates a blocking time for the completed task. For example, the RTOS 211 computes the blocking time as BlkTime=Timestamp[QueueEntry]−Timestamp[StackEntry]−ExecutionTimeTemp[StackEntry]. In the ongoing example, since the instance of task-C is not preempted, the blocking time is 0. In one or more examples, the RTOS 211 maintains a maximum blocking time value, as shown at 384. For example, the RTOS 211 compares the computed blocking time with a current value of the maximum blocking time, and updates the maximum blocking time with the computed value if the latter exceeds the former.

The temporary execution time for task C can now be cleared, ExecTimeTemp(C1)=0, as shown at 386. It should be noted that in systems where a single instance of a task is active at a given instant, 'C1' can be replaced by 'C' in the above examples. Further, the previous time sample is updated to the timestamp from the buffer queue entry, in this case the end-time of the first instance of the task-C 130, as shown at 386. Thus, PreviousTs=CTiEnd_1.

Further yet, at this time, the topmost entry from the intermediate stack 160 is popped, as shown at 390. (See FIG. 6, STEP-4).

Figure 7:
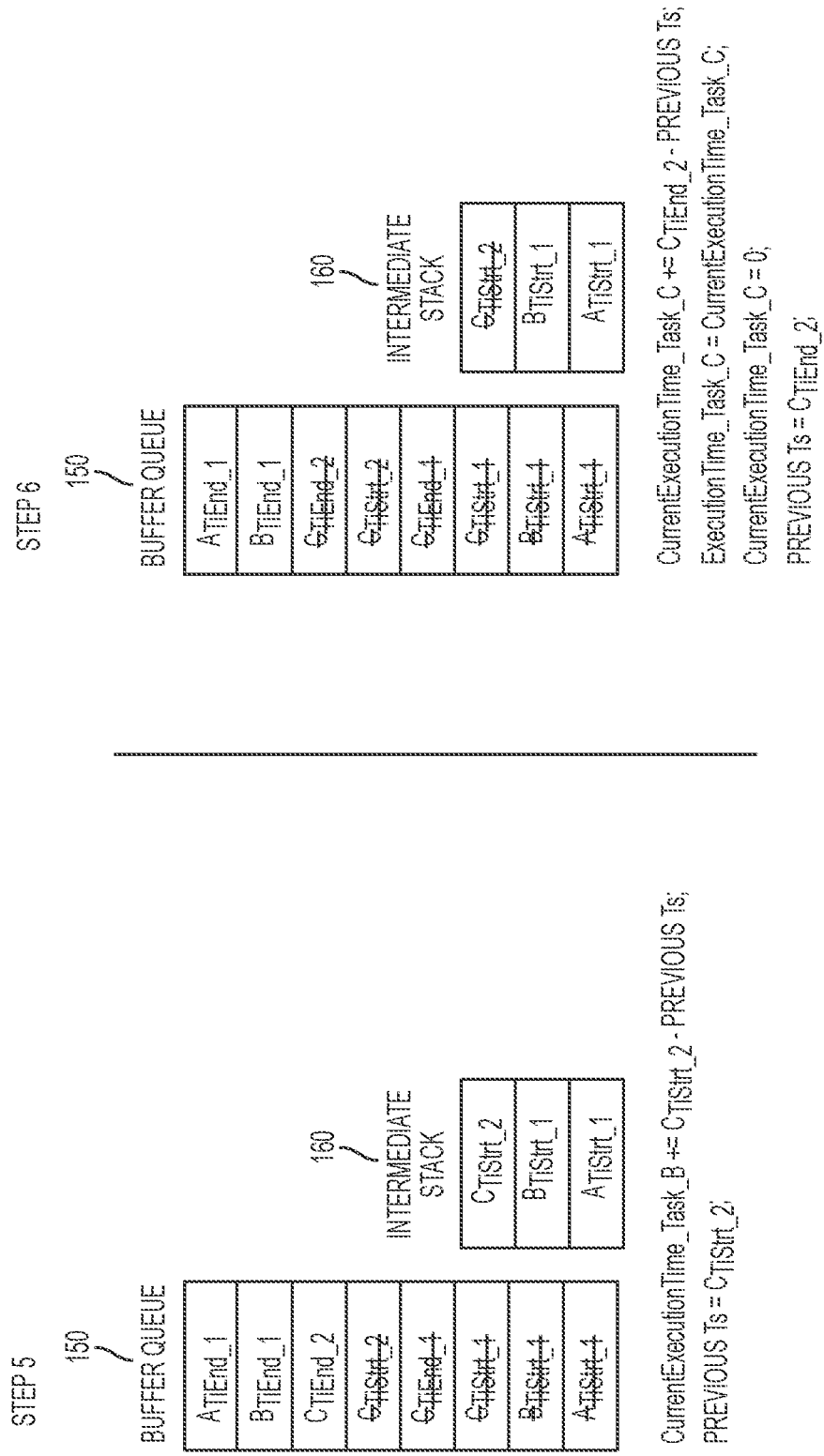
FIG. 7 depicts intermediate states during an example implementation of a method for determining execution parameters of tasks executed by an RTOS at runtime.

In the ongoing example, the RTOS 211 encounters another preemption for the execution of task-B 120, when the second instance of the task-C 130 initiates, as shown at FIG. 7, STEP-5. The RTOS 211 as described herein, updates the temporary execution time of the task-B 120, and computes the execution time and blocking time of the second instance of the task-C 130 once that instance completes execution, as shown in FIG. 7, STEP-6.

Figure 8:
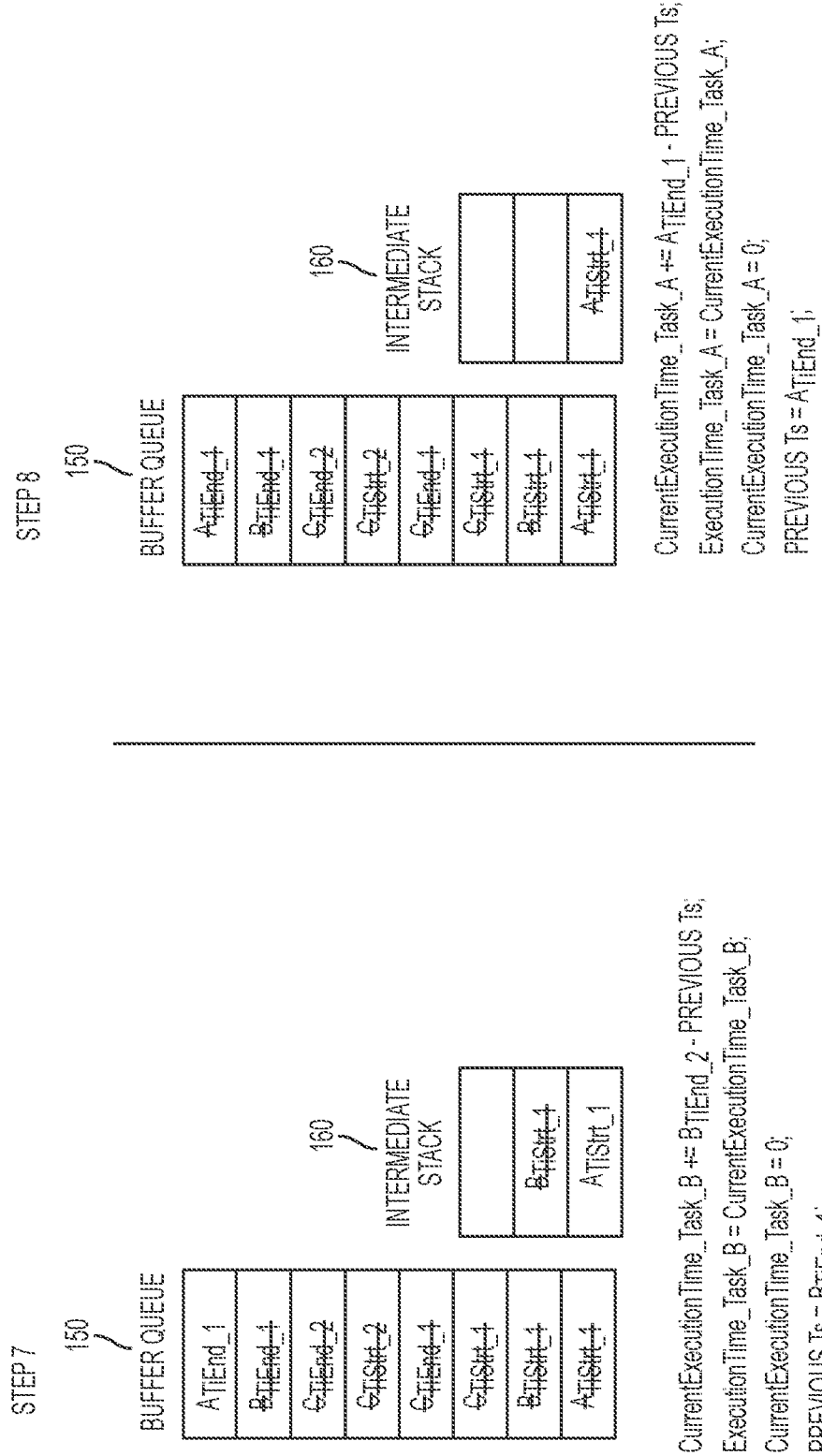
FIG. 8 depicts intermediate states during an example implementation of a method for determining execution parameters of tasks executed by an RTOS at runtime.

Further, as the RTOS 211 proceeds to analyze the buffer queue 150, the RTOS 211 encounters the buffer queue entry corresponding to the end-time of the task-B 120, as shown at FIG. 8, STEP-7. At this time, as depicted in FIG. 3B and according to corresponding description herein, the accumulated temporary execution time of task-B 120 is added to compute the execution time of the task-B. Further, the blocking time of the task-B 120, caused by the two preemptions for the two instances of the task-C, is computed.

Further yet, in the ongoing example, the RTOS 211 encounters the buffer queue entry corresponding to the end-time of the task-A 110, as shown at FIG. 8, STEP-8. At this time, as depicted in FIG. 3B and according to corresponding description herein, the accumulated temporary execution time of task-A 110 is added to compute the execution time of the task-1. Further, the blocking time of the task-1 120, caused by the two preemptions for the two instances of the task-C and the instance of the task-B 120, is computed.

At this time, the buffer queue 150 is empty, as all buffer queue entries are analyzed. Accordingly, the RTOS 211 ends the process, and continues to execute the next tasks as commanded. After the predetermined duration for the analysis bracket, the RTOS 211 loops back for execution of the method to compute the execution parameters of the tasks.

Thus, at every analysis bracket, the RTOS 211 computes execution parameters including the execution time, the blocking time, and the inter-arrival time of each task that the RTOS 211 executed until the analysis bracket started.

In one or more examples, the RTOS 211 prognosticates the state of health of the RTOS 211 based on the computed execution parameters. For example, if the maximum value for any of the execution parameters exceeds a corresponding predetermined threshold value, the RTOS 211 raises an error flag indicating that the health of the RTOS 211 is deteriorating. If the thresholds are not exceeded, then the system 200 continues to operate as programmed In one or more examples, in response to an error, the RTOS 211 restarts the system 200. Alternatively, or in addition, the RTOS 211 generates one or more audio/visual indications of the error.

In one or more examples, the RTOS 211 consolidates the three maximum values for each of the execution parameters computed into a single state of health indicator. For example, the RTOS 211 computes a maximum among the maximum values of the execution parameters. The RTOS 211 further compares such an indicator of the state of health with a predetermined threshold, and raises an error if the threshold is exceeded, and continues the operation if the threshold is not exceeded.

Thus, the technical solutions described herein facilitate an OS health prognosis that can predict an RTOS failure. In one or more examples, the technical solutions compute execution parameter values for individual tasks of the RTOS, periodically per the analysis bracket. In one or more examples, if any of the computed execution parameter values exceeds a predetermined threshold, the technical solutions trigger an indication of degradation in the OS performance, and an error handling is performed. Alternatively, or in addition, in one or more examples, a consolidated RTOS health coefficient value is derived as the maximum of all the execution parameters computed. If the RTOS consolidated RTOS health coefficient value exceeds a predetermined threshold, an error handling is performed.

The error handling depends on the application in which the RTOS is being used. For example, the RTOS may be operating a controller of a power steering system of a vehicle. The controller manages the power assist provided to a steering wheel of the power steering system. In such a scenario, a failure of the RTOS can render the power steering system unable to provide power assist causing the vehicle to operate in an undesirable manner Predicting the RTOS failure and triggering the corresponding error handling can prevent such undesirable effects on the vehicle and/or an operator and/or passengers of the vehicle. In one or more examples, the error handling includes outputting a diagnostic code indicative of the RTOS failure. Alternatively, or in addition, the error handling includes a visual indication, such as a warning symbol or light being displayed. For example, in a vehicle, the warning symbol is displayed on a dashboard of the vehicle. Alternatively, or in addition, the error handling includes an audible warning, such as a beep or any other sound indicative of the predicted RTOS failure.

Alternatively, or in addition, the error handling includes resetting one or more non-critical components of the RTOS 211. In one or more examples, a predetermined list of tasks or components of the RTOS 211 is accessed, and those components are turned off for a predetermined duration, and turned back on. Alternatively, or in addition, the RTOS 211 is completely reset.

Further yet, in one or more examples, in case the RTOS 211 is used in a vehicle, the error handling in response to the predicted RTOS failure includes causing the vehicle to operate in a degraded mode. For example, a velocity of the vehicle may be limited to a predetermined maximum value.

For example, referring now to the FIG. 7 depicts an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

Figure 9:
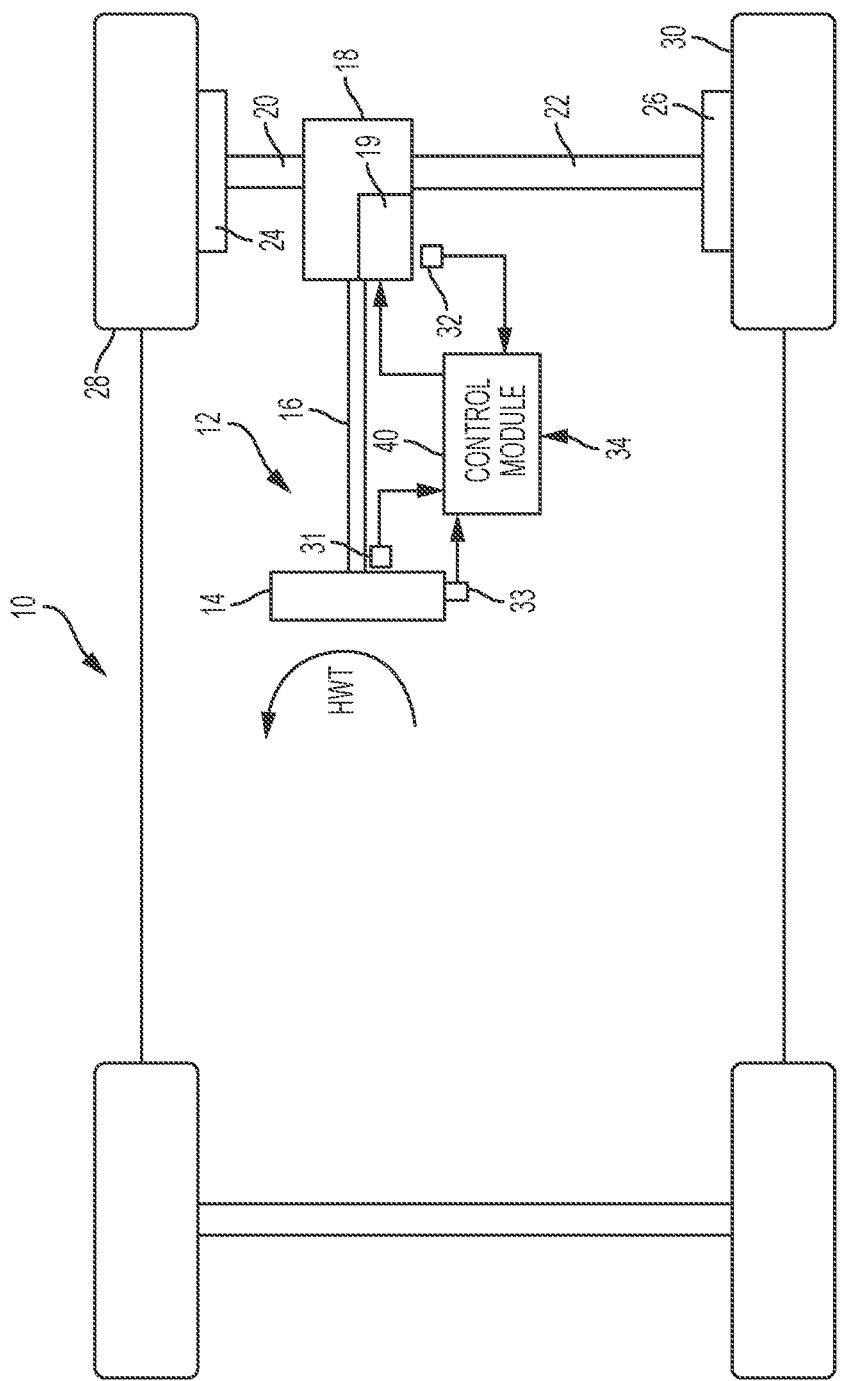
FIG. 9 illustrates a vehicle including a steering system according to one or more embodiments.

As shown in FIG. 9, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning as a control signal that can be used to control aspects of the steering system 12 through the steering assist unit 18.

In one or more examples, the control module 40 is an ECU operated by an RTOS, such as the system 200 (FIG. 2) with RTOS 211. It should be noted that while a steering system 12 operated by an ECU is depicted here, the technical solutions described herein are applicable in various other settings, such as in other ECUs that operate other components of the vehicle 10, for example, engine, exhaust system, tire pressure monitor system, infotainment system, among others. Further yet, the applicability of the technical solutions is not limited to a vehicle, rather to any other field where an RTOS is used, such as medical devices, industrial machines, and the like.

The technical solutions described herein, thus, facilitate determining, at runtime, the timing/execution parameters of RTOS tasks, such as the execution time, the blocking time, and the inter-arrival time. The loading and execution of a background process that facilitates implementation of the technical solutions during the runtime of the task in the RTOS does not add any overhead that prevents using the technical solutions in time critical applications, such as in the EPS system of a vehicle. The RTOS may use the timing parameters to forecast a fault in the task, or the RTOS itself, at runtime.

The execution of the method is light weight and hence can be retained in the production code to determine the task timing parameters on the fly and perform further diagnosis on the timing parameters. Further, the RTOS may execute the technical solutions regardless of a scalability class of the RTOS to capture the timing parameters. It is understood that the method is not restricted to a specific RTOS, or a specific OS.

The example method may be implemented by a system that executes a RTOS. In one or more examples, the system may be an electrical power steering system of a vehicle.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer-implemented method for generating timing parameters of task-instances being executed by a real time operating system (RTOS) at runtime, the method comprising:

dequeing a buffer queue entry from a buffer queue, the buffer queue entry comprising a first task-id of a first task instance executed by the RTOS, a timestamp associated with a start-time and/or an end-time of the task instance;

in response to determining that the first task-id from the buffer queue entry does not match a second task-id from a topmost entry of a stack comprising buffer queue entries:
  pushing the buffer queue entry as a top-entry in a stack;
  updating a previous time sample value as the timestamp of the buffer queue entry; and
  accumulating a temporary execution time value for the second task-id from the stack; and in response to determining that the first task-id from the buffer queue entry matches the second task-id from the topmost entry of the stack;
  generating an execution time value for the second task-id by adding the accumulated temporary execution time value for the second task-id and a difference between the timestamp from the buffer queue entry and the previous time sample value;
  updating the previous time sample value as the timestamp of the buffer queue entry; and
  popping the topmost entry from the stack;

wherein the temporary execution time value of the second task-id is a duration for a single execution of a task corresponding to the second task-id;
predicting a failure of the RTOS in response to the temporary execution time value exceeding a predetermined threshold.

2. The computer-implemented method of claim 1, further comprising: in response to determining that the first task-id from the buffer queue entry does not match the second task-id from the topmost entry of the stack; generating an inter-arrival time for the first task-id.

3. The computer-implemented method of claim 2, wherein generating the inter-arrival time for the first task-id comprises: generating a difference between the timestamp from the buffer queue entry and a previous start time of the task-id from a previous start-time buffer; and storing the timestamp from the buffer queue entry in the previous start-time buffer.

4. The computer-implemented method of claim 2, wherein the inter-arrival time for the first task-id is a duration for which activation of a task corresponding to the first task-id is blocked by a higher priority task.

5. The computer-implemented method of claim 1, further comprising: in response to determining that the first task-id from the buffer queue entry matches the second task-id from the topmost entry of the stack; generating a blocking time for the second task-id by subtracting, from the timestamp from the buffer queue entry, a second timestamp from the topmost entry from the stack and the execution time for the second task-id.

6. The computer-implemented method of claim 5, wherein the blocking time of the second task-id is a duration for which execution of a task corresponding to the second task-id is blocked by a higher priority task.

7. A system for prognostication of real time operating system (RTOS) health, the system comprising:
a memory; and
processor coupled with the memory, the processor configured to operate the RTOS and further to:
analyze a buffer queue comprising a plurality of buffer queue entries, a buffer queue entry comprising a first task-id of a first task instance executed by the RTOS, a timestamp associated with a start-time and/or an end-time of the task instance;
determine timing parameters of tasks executed by the RTOS by:
dequeing the buffer queue entry from the buffer queue;
comparing the buffer queue entry with a topmost entry of a stack, the stack comprising buffer queue entries;
in response to determining that the first task-id from the buffer queue entry does not match a second task-id from a topmost entry of a stack comprising buffer queue entries:
pushing the buffer queue entry as a top-entry in a stack; updating a previous time sample value as the timestamp of the buffer queue entry; and
accumulating a temporary execution time value for the second task-id from the stack; and
in response to determining that the first task-id from the buffer queue entry matches the second task-id from the topmost entry of the stack;
generating an execution time value for the second task-id by adding the accumulated temporary execution time value for the second task-id and a difference between the timestamp from the buffer queue entry and the previous time sample value;

updating the previous time sample value as the timestamp of the buffer queue entry; and
popping the topmost entry from the stack;
wherein the temporary execution time value of the second task-id is a duration for a single execution of a task corresponding to the second task-id;
predicting a failure of the RTOS in response to the temporary execution time value exceeding a predetermined threshold.

8. The system of claim 7, wherein the processor further configured to: in response to determining that the first task-id from the buffer queue entry does not match the second task-id from the topmost entry of the stack; generating an inter-arrival time for the first task-id.

9. The system of claim 8, wherein generating the inter-arrival time for the first task-id comprises: generating a difference between the timestamp from the buffer queue entry and a previous start time of the task-id from a previous start-time buffer; and storing the timestamp from the buffer queue entry in the previous start-time buffer.

10. The system of claim 9, wherein the inter-arrival time for the first task-id is a duration for which activation of a task corresponding to the first task-id is blocked by a higher priority task.

11. The system of claim 10, wherein the processor is further configured to:
predict a failure of the RTOS in response to the inter-arrival time exceeding a predetermined threshold.

12. The system of claim 7, wherein the processor further configured to: in response to determining that the first task-id from the buffer queue entry matches the second task-id from the topmost entry of the stack; generating a blocking time for the second task-id by subtracting, from the timestamp from the buffer queue entry, a second timestamp from the topmost entry from the stack and the execution time for the second task-id.

13. The system of claim 12, wherein the blocking time of the second task-id is a duration for which execution of a task corresponding to the second task-id is blocked by a higher priority task.

14. The system of claim 13, wherein the processor is further configured to:
predict a failure of the RTOS in response to the blocking time exceeding a predetermined threshold.

15. A steering system comprising:
a controller that operates power assist functions of the steering system, the controller using a real time operating system (RTOS), the controller further configured to perform prognostication of health of the RTOS by:
dequeing a buffer queue entry from a buffer queue, the buffer queue entry comprising a first task-id of a first task instance executed by the RTOS, a timestamp associated with a start-time and/or an end-time of the task instance;
in response to determining that the first task-id from the buffer queue entry does not match a second task-id from a topmost entry of a stack comprising buffer queue entries:
pushing the buffer queue entry as a top-entry in a stack;
updating a previous time sample value as the timestamp of the buffer queue entry;
accumulating a temporary execution time value for the second task-id from the stack; and
generating an inter-arrival time for the first task-id; and
in response to determining that the first task-id from the buffer queue entry matches the second task-id from the topmost entry of the stack;

generating an execution time value for the second task-id by adding the accumulated temporary execution time value for the second task-id and a difference between the timestamp from the buffer queue entry and the previous time sample value;

generating a blocking time for the second task-id by subtracting, from the timestamp from the buffer queue entry, a second timestamp from the topmost entry from the stack and the execution time value for the second task-id;

updating the previous time sample value as the timestamp of the buffer queue entry; and popping the topmost entry from the stack;

wherein the execution time value of the second task-id is a duration for a single execution of a task corresponding to the second task-id;

predicting a failure of the RTOS in response to the execution time value exceeding a predetermined threshold.

16. The steering system of claim 15, wherein:
the execution time of a task corresponding to the second task-id is a duration for a single execution of the task;
the blocking time of the task is a duration for which execution of the task is blocked by one or more higher priority tasks; and
the inter-arrival time of the task is a duration for which activation of the task is blocked by one or more higher priority tasks.

17. The steering system of claim 16, wherein generating the inter-arrival time for the first task-id comprises: generating a difference between the timestamp from the buffer queue entry and a previous start time of the task-id from a previous start-time buffer; and storing the timestamp from the buffer queue entry in the previous start-time buffer.

18. The steering system of claim 17, wherein the blocking time for the second task-id is computed by subtracting, from the timestamp from the buffer queue entry, a second timestamp from the topmost entry from the stack and the execution time for the second task-id.

* * * * *